United States Patent [19]
Cain et al.

[11] Patent Number: 5,786,825
[45] Date of Patent: *Jul. 28, 1998

[54] VIRTUAL DISPLAY SUBSYSTEM IN A COMPUTER

[75] Inventors: Bradley W. Cain; Frederick S. Dunlap, both of Longmont; Joseph F. Baldwin, Ft. Collins, all of Colo.

[73] Assignee: National Semiconductor, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 571,498

[22] Filed: Dec. 13, 1995

[51] Int. Cl.[6] ............... G06T 1/00; G06F 15/00
[52] U.S. Cl. ............ 345/501; 345/132; 345/506; 345/509; 395/500
[58] Field of Search .................. 345/501, 502, 345/506, 509, 511, 512, 522, 185, 189, 201, 132; 395/734, 733, 800, 500

[56] References Cited

U.S. PATENT DOCUMENTS

| | | | |
|---|---|---|---|
| 4,514,805 | 4/1985 | McDonough et al. | 395/734 |
| 4,812,975 | 3/1989 | Adachi et al. | 395/500 |
| 4,885,681 | 12/1989 | Umeno et al. | 395/406 A |
| 5,155,838 | 10/1992 | Kishi | 395/500 |
| 5,175,853 | 12/1992 | Kardach et al. | 395/733 |
| 5,404,445 | 4/1995 | Matsumoto | 395/520 |
| 5,455,909 | 10/1995 | Blomgren et al. | 395/570 |
| 5,502,808 | 3/1996 | Goddard et al. | 345/185 |
| 5,560,002 | 9/1996 | Kardach et al. | 395/555 |
| 5,590,312 | 12/1996 | Marisetty | 395/733 |

*Primary Examiner*—Kee M. Tung
*Attorney, Agent, or Firm*—Andrew S. Viger; John L. Maxin

[57] ABSTRACT

A processing system removes the burden of maintaining legacy hardware by employing a system management mode mechanism to provide an environment for virtualizing preexisting memory and I/O space instructions into operations for high resolution raster graphics circuitry, thus maintaining functionality and backwards compatibility with preexisting software.

20 Claims, 5 Drawing Sheets

VIRTUAL DISPLAY SUBSYSTEM IN A COMPUTER

CROSS-REFERENCE TO RELATED APPLICATIONS

This patent is related to commonly assigned U.S. patent applications Ser. No. 08/458,326, entitled "Virtualized Audio Generation And Capture In A Computer", filed Jun. 2, 1995; Ser. No. 08/498,965, entitled "Virtualized Functions Within A Microprocessor", filed Jul. 6, 1995; Ser. No. 08/540,351, Attorney's Docket No. CX-00253, entitled "Virtual Subsystem Architecture", filed Oct. 6, 1995; and Ser. No. 08/541,359, Attorney's Docket No. CX-00258, entitled "Enhanced System Management Mode With Nesting", filed Oct. 10, 1995, the disclosures of all herein incorporated by reference.

BACKGROUND OF THE INVENTION

1. Field of the Invention

The invention generally relates to displaying images and more particularly, to a system and method of transparently virtualizing a display subsystem in a computer having high performance raster graphics circuitry through the use of a system management mode mechanism and software handlers.

2. Description of Related Art

The fast evolution of the de facto IBM personnel computer ("PC") standard is well documented. Particularly, the video display portion of the PC standard originally specified a video adapter board which plugged into the so-called industry standard architecture ("ISA") bus having an eight bit width. The display formats originally supported by the adapter boards, the so-called monochrome display adapter ("MDA"), the color graphics adapter ("CGA"), and the extended graphics adapter ("EGA") formats, quickly became antiquated with the evolution of application programs requiring higher definition text and graphics. To this end, the so-called "VGA" (Video Graphics Array a.k.a. Variable Graphics Array) standard arose which not only provided additional resolution capability, but also included backward compatible "modes" for MDA and CGA. The VGA standard employs a hodgepodge of "customized" circuitry, which initially, was directly mounted onto the computer "motherboard" with ISA bus add-on adapter boards emerging quickly thereafter.

The VGA display standard is traditionally achieved by an application program running on the central processing unit (CPU). The application program writes data and control information to the customized circuitry, either directly or indirectly through software routines stored in a basic input output system (BIOS) memory. While the BIOS memory approach relieves the programmer of VGA control details within the application program, it ostensibly limits flexibility. More specifically, the BIOS memory approach only supports fifteen predetermined modes while direct programming can produce many more combinations of color and resolution. In fact, many popular application programs avoid the BIOS routines and write directly to the customized circuitry to provide unique display characteristics.

The customized VGA circuitry can be logically parsed into a number of functional units, namely, a graphics controller, a sequencer, a CRT controller, an attribute controller, a general register set, and a buffered digital-to-analog converter (i.e. RAMDAC). The graphics controller provides the interface between the CPU and a dual ported frame buffer memory, allowing the programmer to read and write frame buffer data and providing raster operations "ROPs" and masking functions. The sequencer decomposes word and double-word CPU accesses into byte operations for the graphics controller and also controls a number of miscellaneous functions, including reset and clocking controls. The CRT controller provides video timing signals, address generation for video refresh, and a text cursor. The attribute controller contains the video refresh datapath, including text rasterization and palette lookup. The general register set provides status information for the programmer, as well as control over the VGA host address mapping and clock selection. The RAMDAC converts digital data into analog signals to drive the display.

Generally speaking, the VGA standard supports four basic pixel formats which are selectable by the graphics controller. The first format, text, interprets data in the frame buffer memory as ASCII characters, foreground/background attributes, and font data. The other three formats are graphics modes, some times referred to as "all points addressable" modes, also referred to as CGA-compatible (odd/even 2 bits/pixel), EGA-compatible (4-plane 4 bits/pixel), and VGA only 256 colors (pixel-per-byte 8 bits/pixel).

The VGA standard, while extremely popular and seemingly flexible for its time, is plagued with a number of limitations. One limitation is the cumbersome hodgepodge circuitry and the associated awkward programming protocol required to address and change the display. More importantly however, another limitation is that application programs are requiring more sophisticated, higher resolution, higher bandwidth, graphical display protocols, that the VGA standard simply cannot support.

It can be seen from the foregoing however, that pre-existing display standards, such as the VGA standard, cannot be abandoned without forfeiting a plethora of legacy software that currently exists and which is adequate for a number of applications. Accordingly, there is a need to support higher resolution, higher bandwidth, graphical display protocols while supporting pre-existing display standards, such as VGA, without the baggage of legacy circuitry.

SUMMARY OF THE INVENTION

To overcome the limitations of the prior art described above, and to overcome other limitations that will become apparent upon reading and understanding the present specification, the present invention discloses a processing system which employs a system and method of transparently virtualizing a display subsystem without the inclusion of all the legacy circuitry. Event trap circuitry invokes a system management mode mechanism responsive to the occurrence of events in an application program executed by a native central processing unit, to control raster graphics circuitry to generate a display format—all of which is transparent to the application program. The events, which typically include the execution of an instruction or string of instructions intended to control a particular display subsystem such as, but not limited to, VGA, are trapped and translated to control high resolution raster graphics circuitry. The raster graphics circuitry, which is capable of supporting high speed, high bandwidth, display operation, may include a minimal amount of hardware-assist circuitry that along with video display handlers executing under the system management mode mechanism, assimilates a particular display subsystem, such as, but not limited to, VGA.

A feature of the present invention is providing a display format, such as VGA, without the aid of dedicated circuitry.

Another feature of the present invention is a high degree of integration and amortization of native central processing unit bandwidth to run both application software and to virtualize a display subsystem.

Another feature of the present invention is direct efficiency dependency of the virtualized display subsystem on native central processing unit speed.

Another feature of the present invention is that the virtualized display subsystem is independent of the operating system.

Another feature of the present invention is that the virtualized display subsystem is indistinguishable from a legacy hardware display subsystem (i.e. transparent to application and operating system programs).

Another feature of the present invention is that the virtualized display subsystem does not require any special memory management handlers.

Another feature of the present invention is ease of upgrading new virtualized display subsystem programming.

Another feature of the present invention is minimal impact on the manufacturing cost of the computer system.

These and various other objects, features, and advantages of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a specific example of a processing system employing a virtual display subsystem, practiced in accordance with the present invention.

DESCRIPTION OF THE PREFERRED EMBODIMENT

Figure 1:
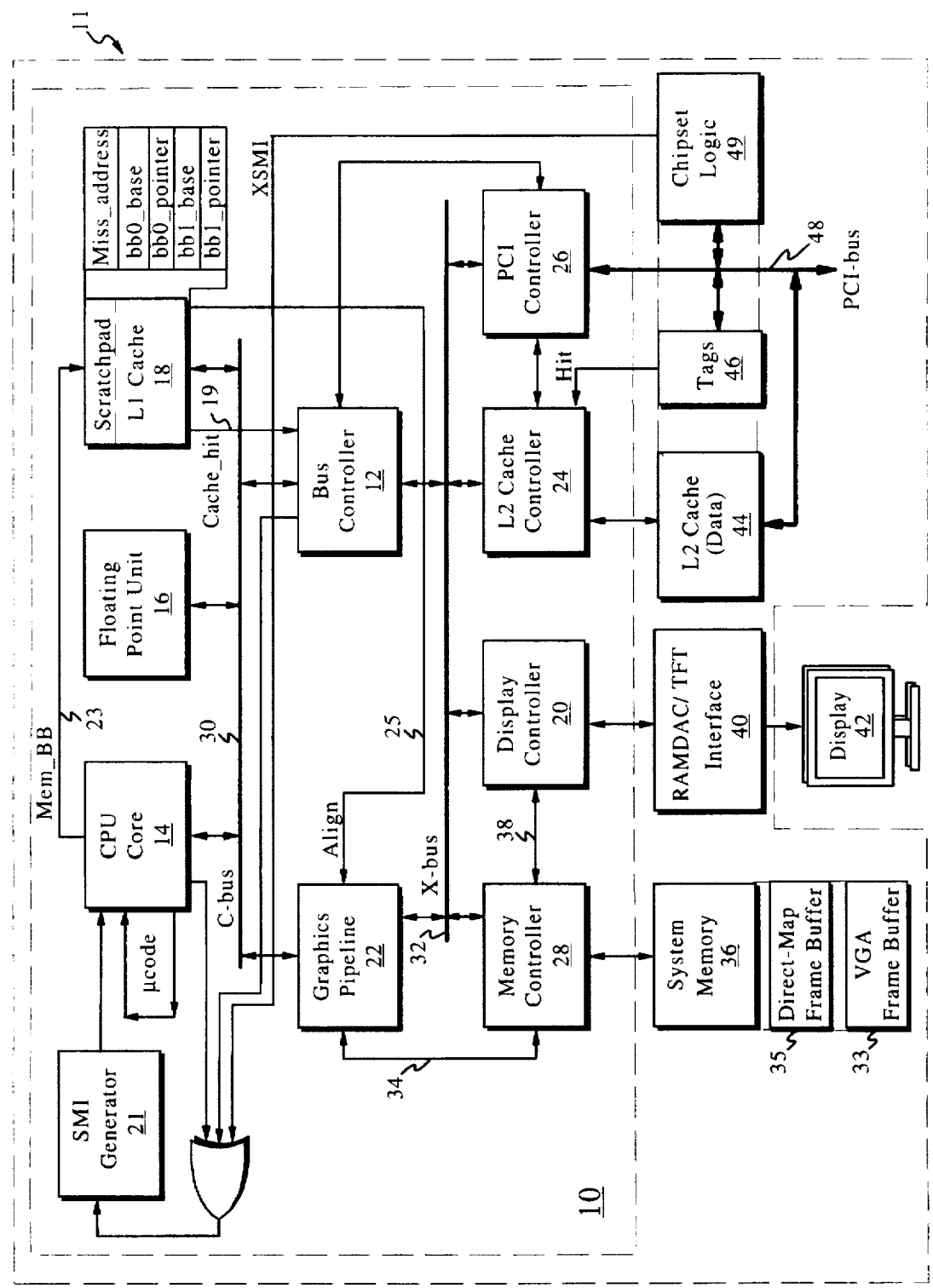
FIG. 1 is a block diagram of an exemplary, but not exclusive, processing system employing a virtual display subsystem, practiced in accordance with the principles of the present invention.

The detailed description of the preferred embodiment for the present invention is organized as follows:
1. Exemplary Processing System Employing A Virtualized Display Subsystem
2. Exemplary System Management Mode Mechanism
3. Event Trap Circuitry
   3.1 VGA Memory Accesses
   3.2 VGA I/O Accesses
4. Raster Graphics Circuitry
   4.1 VGA Sequencer
   4.2 VGA Write Path
   4.3 VGA Read Path
   4.4 VGA Address Generator And VGA Frame Buffer Memory
5. Process Flow For A Virtualized Display Subsystem
   5.1 I/O Write Handler
   5.2 I/O Read Handler
   5.3 Memory Write Handler
6. Conclusion This organizational table, and the corresponding headings used in this detailed description, are provided for the convenience of reference only and are not intended to limit the scope of the present invention. It is to be understood that while the preferred embodiment is described hereinbelow with respect to the χ86 computer architecture, it has generally applicability to any architecture. Certain terminology related to the χ86 computer architecture (such as register names, signal nomenclature, etc.) which is known to practitioners in the field of microprocessor design, is not discussed in detail in order not to obscure the disclosure.

Moreover, structural details which will be readily apparent to those skilled in the art having the benefit of the description herein have been illustrated in the drawings by readily understandable block representations and flow diagrams, showing and describing only those details that are pertinent to the present invention. The block and flow diagrams in the figures do not necessarily represent the physical arrangement of the exemplary system, but are primarily intended to illustrate the major structural components in a convenient functional grouping, wherein the present invention may be more readily understood. It is to be understood that other embodiments may be utilized and structural changes may be made without departing from the scope of the present invention.

Throughout the specification, it is to be understood that the term "handler" is used to describe a convenient functional program module that is processed or "executed" by the central processing unit. The phrase "system management mode mechanism" is used to describe cooperative hardware and software that provides an environment independent of the operating system or application program. It is also to be understood that a condition, event, or method of implementation of a function being "transparent to an application program" describes that the application program neither knows nor needs to know of the condition, event, or method of implementation of a function to execute or "run" properly.

It should also be understood that the term "control registers" is used throughout the specification to describe a mechanism for holding programmable values to select control, program, and data flow. Those skilled in the art, with the aid of the present disclosure, will recognize many forms and locations for control registers without departing from the scope of the present invention. The term "virtualize" is intended to mean assimilation of properties expected of a device or subsystem responsive to an application program, without the actual presence of the device or subsystem.

Many "terms of art" and VGA operations are referenced herein which are well recognized by those skilled in the art. However for thoroughness and convenience, reference is made to *The Programmer's Guide To PC Video Systems*, 2nd Edition, by Richard Wilton, Microsoft Press, © 1994, said guide herein incorporated by reference.

1. Exemplary Processing System Employing A Virtualized Display Subsystem

Reference is now made to FIG. 1 which depicts an exemplary, but not exclusive processing system employing a virtualized display subsystem, practiced in accordance with the principles of the present invention. It is to be understood that while the present invention is described with respect to a highly integrated processing unit, it has general application to all processing systems, including systems having a microprocessor with an external data/address bus with external circuitry attached thereto, such as a memory controller or raster graphics circuitry. However, the preferred embodiment includes a system circuit board 11 (a.k.a. motherboard) preferably having buses to couple together a highly integrated CPU 10 (described in more detail hereinbelow), system memory 36, a RAMDAC/thin film transistor (TFT) interface 40, L2 cache 44, and chipset logic circuitry 49. A multi-tasking operating system program such as Microsoft® Windows™ preferably executes on the CPU 10 to manage primary operations.

The CPU 10 preferably, although not exclusively, includes the following functional units: an internal bus controller 12, a CPU core 14, a (level-one) L1 cache 18—part of which is partitionable as a scratchpad memory, a memory controller 28, a floating point unit (FPU) 16, a display controller 20, an internal SMI generator 21, a graphics pipeline (a.k.a. graphics accelerator) 22, a (level-two) L2 cache controller 24, and a Peripheral Component Interconnect (PCI) bus controller 26. The PCI bus is a widely adopted protocol for use as a so-called "local" or "mezzanine" bus to couple external devices to the CPU core 14 without interfering with activity on the immediate "CPU bus". Accordingly, ancillary activities can take place substantially simultaneously without inducing much latency into CPU core execution. The PCI-bus protocol is described in, among other places, the *PCI Local Bus Specification Rev. 2.0*, dated Apr. 30, 1993, by the PCI Special Interest Group, Hillsboro, Oreg., and the *Microprocessor Report* article entitled *Local Buses Poised To Enter PC Mainstream*, dated Jul. 8, 1992, by Michael Slater and Mark Thorson, both herein incorporated by reference.

The display controller 20, graphics pipeline 22, direct-mapped frame buffer 35, and RAMDAC/TFT interface 40 collectively comprise raster graphics circuitry which may be partially or fully, internal or external, to the CPU 10.

The bus controller 12, the CPU core 14, the FPU 16, the L1 cache 18, and the graphics pipeline 22, are coupled together through an internal (with respect to the CPU 10) C-bus 30 whose exact configuration is not necessary for the understanding of the present invention. The bus controller 12, display controller 20, the graphics pipeline 22, the L2 cache controller 24, the PCI-bus controller 26, and the memory controller 28 are coupled together through an internal (with respect to the CPU 10) X-bus 32. The details of the C-bus 30 and X-bus 32 are not necessary for the understanding of the present invention. It is sufficient to understand that independent C and X buses 30 and 32 decouple these functional units within the CPU 10 so that for example, the CPU core 14, the FPU 16, and L1 cache 18 can operate substantially autonomously from the remainder of the CPU 10 and so that other activities (e.g. PCI-bus transfers, L2 cache transfers, and graphics updates) can be conducted independently. More specifically, the C-bus 30 has sufficient bandwidth to allow the graphics pipeline 22 to access the scratchpad memory while the CPU core 14 is performing an unrelated operation.

The CPU core 14 in the preferred embodiment is a six stage pipeline. The exact details of the CPU core 14 pipe stages however, are not important for the understanding of the present invention. It is sufficient to understand that a plurality of bytes are fetched into a buffer during the instruction fetch (first) stage, decode and scoreboard checks are performed during the instruction decode (second) stage, linear memory address calculations are performed during a pre-address calculation (third) stage, physical address calculations are performed during an address translation (fourth) stage, instructions are executed during the execution (fifth) stage, and the results of the instruction execution are written to write buffers during the writeback (sixth) stage. Those skilled in the art, with the aid of the present disclosure, will recognize other number of stages for the pipeline and other configurations for the CPU core 14 without departing from the scope of the present invention.

The L1 cache 18 is preferably, although not exclusively, a 16K byte unified data/instruction cache that operates in either a write-through or write-back mode. An area of the L1 cache 18 can be programmably partitioned as the scratchpad memory through configuration control registers (not shown) in the CPU core 14. Scratchpad control circuitry in the L1 cache 18 includes data pointers which can be used by either the CPU core 14 or the graphics pipeline 22 to access data in the scratchpad memory. The scratchpad memory may also be addressed directly by the CPU core 14.

An exemplary, but not exclusive, use for the scratchpad memory is as a blit buffer for use by the graphics pipeline 22. More specifically, whenever data is moved on the display 42, a raster line (scanline) of data is read from the direct-mapped frame buffer 35 (preferably in system memory 36), written to the blit buffer partitioned out of the L1 cache 18, and then read back out and written to another region of the direct-mapped frame buffer 35. Programs executed by the CPU core 14 can also directly put data into the blit buffer and have the graphics pipeline 22 autonomously read it out and put it in the direct-mapped frame buffer 35.

The preferred L1 cache 18, along with other exemplary applications for the scratchpad memory, are described in co-pending U.S. patent application Ser. No. 08/464,921, filed Jun. 5, 1995, entitled "Partionable Cache", assigned to the Assignee of the present invention and herein incorporated by reference. It is to be understood however, that the L1 cache 18 may be larger or smaller in size or may have a Harvard "split" architecture without departing from the scope of the present invention. It is also to be understood that the scratchpad memory may be a memory separate from the L1 cache 18 or may be absent altogether, without departing from the scope of the present invention.

The graphics pipeline 22 is coupled to the memory controller 28 through a dedicated bus 34 that expedites block moves of data from the scratchpad memory (blit buffer) to the VGA frame buffer 33 and to the direct-mapped frame buffer memory 35, which in the preferred embodiment, resides as part of system memory 36. The direct-mapped frame buffer memory 35 is addressed through the memory controller 28 producing a base address and the graphics pipeline 22 producing an offset, avoiding protection and privilege checks normally associated with address generation.

BitBlt operations of the graphics pipeline 22 are initiated by writing to a control register (not shown) in the CPU core 14 which specifies: i) the type of source data required, if any, frame buffer, or blit buffer; ii) the type of destination data required, if any, frame buffer, or blit buffer; iii) where the graphics pipeline 22 writes the data, direct-mapped frame buffer 35, or system memory 36, and iv) a source expansion flag. When the source is an image in system memory 36, the data is loaded from system memory 36 into the blit buffer before starting the BitBit operation. Destination data is also loaded into the blit buffer when the graphics pipeline 22 renders to system memory 36.

The internal bus controller 12 coordinates and prioritizes transfers between the C and X buses 30 and 32, respectively. The memory controller 28 controls main system memory 36 and cooperates with the internal bus controller 12 to determine cacheability and permits all DMA cycles to automatically snoop the L1 cache 18 and the L2 cache 44. The FPU 16 performs floating point operations.

The display controller 20 which is coupled to the memory controller 28 through a fast link 38, retrieves image data from the direct-mapped frame buffer memory 35, performs a color look-up if required, inserts cursor and icon overlays into a pixel data stream, generates timing, and formats the pixel data for output to the RAMDAC/TFT interface 40 which in turn drives a display 42.

The L2 cache controller 24 and PCI controller 26 collectively provide, inter alia, a high speed interface for an "off-chip" L2 cache 44 (with respect to the CPU 10). The preferred, although not exclusive, L2 cache interface is described in co-pending U.S. patent application Ser. No. 08/522,219 filed Aug. 31, 1995, entitled "L2 Cache Interface", assigned to the Assignee of the present invention and herein incorporated by reference. It is to be understood however, that other forms for the L2 cache interface may be practiced without departing from the scope of the present invention. It should also be understood that while the L2 cache 44 shares the same physical data, address, and control lines on the PCI-bus 48, that for performance reasons, the clock speed and communication protocol are not necessarily related to the PCI protocol. Data accesses to the L2 cache 44 are mutually exclusive with other "PCI-like" PCI-bus 48 accesses, however, writes to the PCI-bus 48 do access the cache tag and control logic circuitry 46 and invalidate the tag on a hit.

In the preferred embodiment, the cache tag and control logic circuitry 46, which determines whether a hit/miss has occurred, is provided separately from the data cache 44 in external chipset logic circuitry 49. Those skilled in the art will recognize other forms and arrangements for the cache tag and control logic circuitry 46, such as, but not limited to, integrated circuitry onto the CPU 10, without departing from the scope of the present invention.

The SMI generator 21 receives a first input from the CPU core 14, a second input from the internal bus controller 12, and a third input (XSMI) from a source external to the CPU 10, preferably from the chipset logic circuitry 49. Chipset logic circuitry 49 is coupled to the PCI-bus 46 and preferably has interface logic including, but not limited to, FIFO buffers for receiving incoming and outgoing data and indicators to indicate fullness of a given buffer. The chipset logic circuitry 49 preferably also includes comparators and other trap circuitry to detect and indicate the occurrence of predetermined events outside the CPU 10. In the preferred embodiment, the chipset logic circuitry 49 includes an SMI timer for generating a vertical retrace interval to update the display 42.

2. Exemplary System Management Mode Mechanism

Any and all system management mode mechanisms are contemplated for use with the present invention, such as disclosed in pending U.S. patent application Ser. No. 08/388,127, filed Mar. 9, 1995, entitled "Enhanced System Management Method And Apparatus With Added Functionality", which is a file-wrapper-continuation of U.S. patent application Ser. No. 08/062,014, which is a continuation-in-part application of U.S. patent application Ser. No. 07/900,052, filed Jun. 17, 1992, all assigned to the Assignee of the present invention, and all herein incorporated by reference.

The currently preferred embodiment for the system management mode (SMM) mechanism however, is a reentrant supervisory operating mode with multiple threads of execution, entered in response to a high priority system management interrupt (SMI). An exemplary, but not exclusive reentrant SMM, is disclosed in pending U.S. patent application Ser. No. 08/541,359, filed Oct. 10, 1995, entitled "Enhanced System Management Mode With Nesting", Attorney's Docket No. CX-00258, assigned to the Assignee of the present invention, and herein incorporated by reference. Those skilled in the art will recognize other forms of reentrant SMM without departing from the scope of the present invention.

For purposes of the present invention, it is sufficient to understand that the reentrant SMM mechanism permits the video display handler transparent time-division-multiple-access (TDMA) to the CPU core 14 for execution.

3. Event Trap Circuitry

The processing system of the present invention provides VGA compatibility with pixel-packed raster graphics circuitry by trapping and redirecting accesses to memory and I/O space designated as VGA. An exemplary, but not exclusive mechanism for trapping accesses to memory and I/O space is disclosed in pending U.S. patent application Ser. No. 08/540,351, filed Oct. 6, 1995, entitled "Virtual System Architecture", Attorney's Docket No. CX-00253, assigned to the Assignee of the present invention, and herein incorporated by reference. Memory write operations to space allocated for the VGA frame buffer are detected during the address translation (fourth) stage of the heavily pipelined CPU core 14. Memory read operations to space allocated for the VGA frame buffer, while preferably handled by hardware, can be detected and trapped during the address translation stage as well.

I/O read and write operations to space allocated for VGA, while contemplated as being detectable in the CPU core 14, are preferably detected outside the core 14 by bus controller 12. It is to be understood that the I/O reads and write operations could be detected in the same pipe stage of the CPU core 14 as memory reads and write operations without departing from the scope of the present invention.

3.1 VGA Memory Addresses

With reference to FIG. 1, the SMI Generator 21 receives a first input from memory address trap circuitry in the CPU core 14. The memory address trap circuitry is preferably configurable to trap accesses in the following ranges: A0000h to AFFFFh, B0000h to B7FFFh, or B8000h to BFFFFh, which cover the (hexadecimal) addresses used by EGA and VGA, MDA, and CGA compatible devices, respectively. In the preferred embodiment, the memory address trap circuitry monitors the address translation (fourth) stage of the pipelined CPU core 14 for physical addresses in the range of A0000h-BFFFFh to trap on VGA, MDA, and CGA instructions which enter into the execution (fifth) stage and retire in the writeback (sixth) stage. Those skilled in the art will recognize other forms of memory address trapping and other stages within the CPU core 14 without departing from the scope and spirit of the present invention. While the trapped instruction enters into the execution (fifth) and writeback sixth stages, it is preferably quashed by the bus controller 12.

The memory trap circuitry preferably further includes a control register having three bits to selectively inhibit SMI generation for accesses to each of the address ranges A0000h to AFFFFh, B0000h to B7FFFh, and B8000h to BFFFFh, respectively. On a soft reset or power-up, the control register bits default to a "no-trap" value so that an external adapter card functions properly without the CPU 10 performing any special configuration routines.

The memory address trap circuitry also preferably, although not exclusively, includes a 32-bit mask register which further masks selective regions, preferably in 2K byte increments, within the A0000h to AFFFFh range. To improve performance for double-buffered display applications, the mask register is used to inhibit SMI generation for the non-displayable writes. That is, writes to regions within the A0000h to AFFFFh range which are enabled but not displayed, do not cause an SMI, thus avoiding the latency associated with the SMI. It is to be understood that those skilled in the art with the aid of the present disclosure, will recognize other means for masking 2K byte blocks such as, but not limited to, range comparators without departing from the scope of the present invention.

3.2 VGA I/O Address Accesses

The SMI Generator 21 receives a second input from I/O address trap circuitry in the bus controller 12 that preferably detects I/O address accesses in the range of 3B0h to 3DFh. The I/O address trap circuitry also preferably includes a control register having a bit for each I/O address range 3B0h to 3BFh, 3C0h to 3CFh, and 3D0h to 3DFh, respectively, to selectively enable SMI generation for MDA, CGA, and EGA/VGA accesses.

4. Raster Graphics Circuitry

Figure 2:
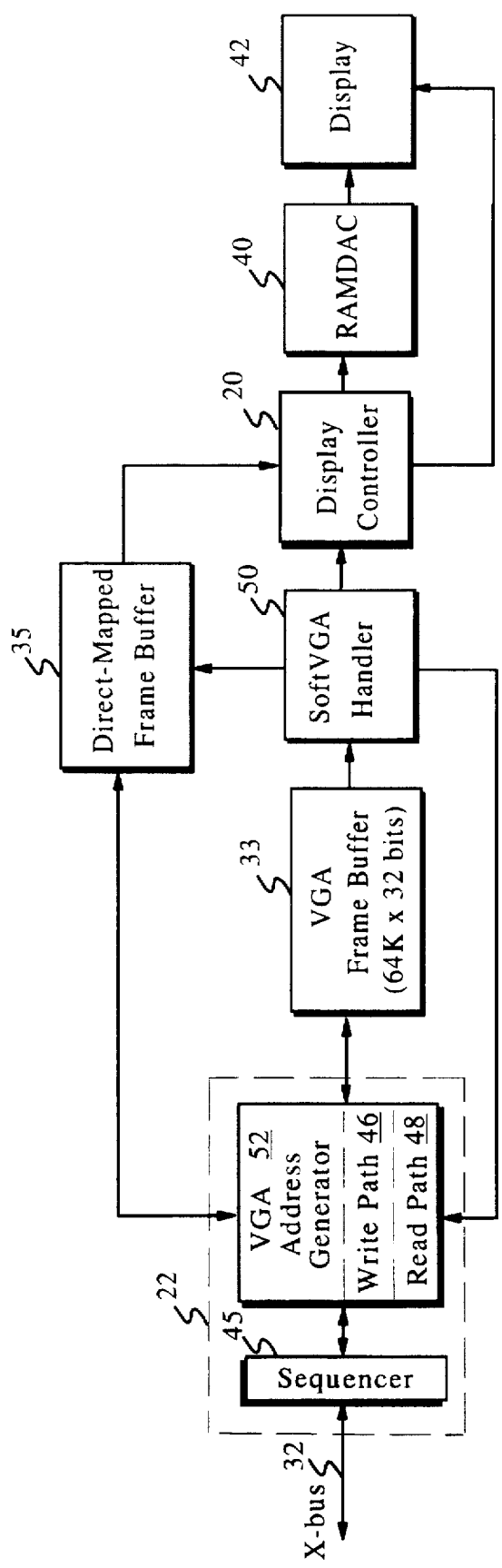
FIG. 2 is a more detailed block diagram of raster graphics circuitry and relevant portions of the central processing unit for virtualizing the VGA display standard.

Reference is now made to FIG. 2 which depicts a more detailed block diagram of raster graphics circuitry and other relevant portions within the CPU 10 for virtualizing the VGA display standard.

4.1 VGA Sequencer

A VGA sequencer 45 located in the front end of the graphics pipeline 22, divides up multi-byte read and write requests over the X-bus 32 into a sequence of single byte reads and writes thereby providing an interface to the eight bit wide ISA bus and a thirty-two bit wide display memory. More specifically, sixteen, twenty-four, and thirty-two bit (Word, Dword) writes over the X-bus 32 to VGA frame buffer memory 33 are parsed into multiple, eight-bit (byte) writes and sent through a VGA write path 46 in the graphics pipeline 22. Likewise, sixteen, twenty-four, and thirty-two bit reads over the X-bus 32 from VGA frame buffer memory 33 are accumulated from sequential eight bit reads through the VGA read path 48 in the graphics pipeline 22.

4.2 VGA Write Path

The VGA write path 46 in the graphics pipeline 22 provides VGA write operations into VGA frame buffer memory 33. The VGA write path 46 converts eight bit writes from the VGA sequencer 45 into thirty-two bit writes to the VGA frame buffer memory 33, in accordance with VGA operation principles. The operations performed by the VGA write path 46 include, but are not limited to, data rotation, raster operation (ALU), bit masking, plane select, plane enable, and write modes—all of which are known to those skilled in the art and which are described in *The Programmer's Guide To PC Video Systems*, 2nd Edition, by Richard Wilton, Microsoft Press, © 1994, which is herein incorporated by reference.

In accordance with principles of the preferred embodiment, an access by an application program to memory space designated as being in the VGA frame buffer 33 generates an SMI, if and only if, the memory location is marked in the control and mask registers as being displayable. As discussed in more detail hereinbelow, the SoftVGA handler 50 is invoked under SMM by the SMI to update the direct-mapped frame buffer 35. The SoftVGA handler 50 includes a VGA register data structure which maintains the state of the VGA registers. The VGA register data structure includes a plurality of entries, each entry corresponding to a single VGA register and associated control values.

4.3 VGA Read Path

The VGA read path 48 in the graphics pipeline 22 performs VGA read operations from VGA frame buffer memory 33 without an SMI being generated by the SMI generator 21. The VGA read path 48 converts thirty-two bit reads from the VGA frame buffer memory 33 to eight bit data for the VGA sequencer 45. The VGA read path 48 performs color compare, plane read select, and read modes—all of which are known to those skilled in the art and which are described in *The Programmer's Guide To PC Video Systems*, 2nd Edition, by Richard Wilton, Microsoft Press, © 1994, which has been incorporated by reference.

4.4 VGA Address Generator And VGA Frame Buffer Memory

A VGA address generator 52 in the graphics pipeline 22 receives address information from a VGA access (A0000h to BFFFFh), a base address of the VGA frame buffer memory 33 from an internal register, and control bits from an internal register, to interpret odd/even and chain 4 addressing modes to re-map addresses to memory space being used for a VGA frame buffer. The VGA frame buffer memory 33 is preferably separate from system memory 36 and is 256K bytes in size, organized as 64K by 32-bits and mapped into high physical memory through the use of a base address.

5. Process Flow For A Virtualized Display Subsystem

5.1 I/O Write Handler

Figure 3:
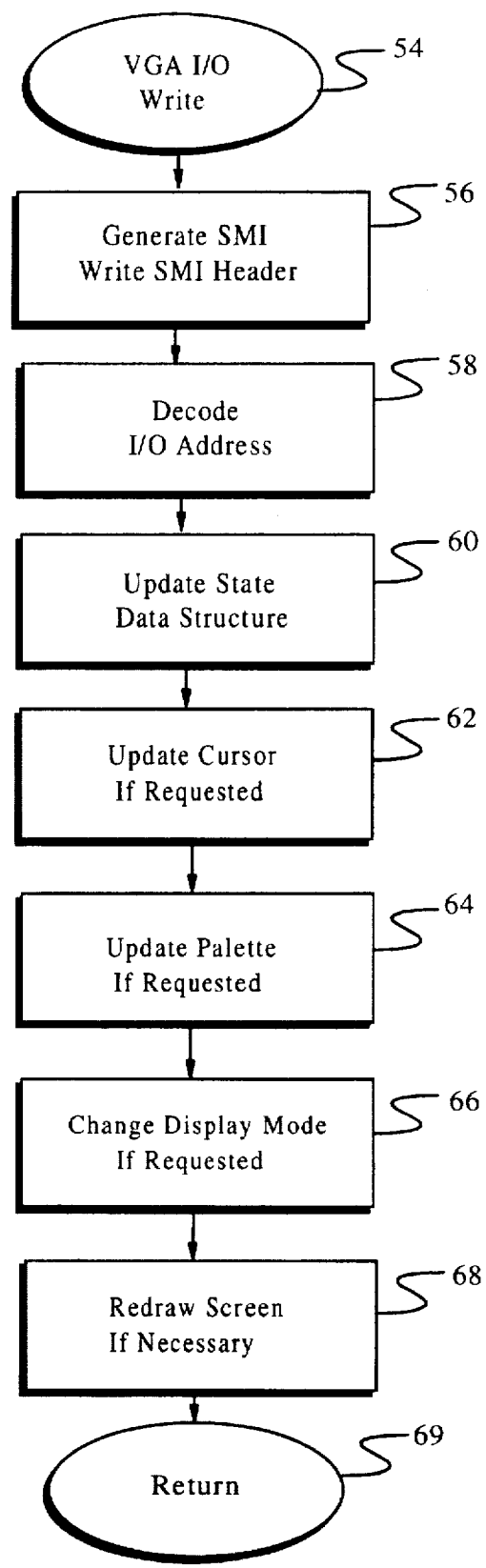
FIG. 3 depicts a flow diagram of a handler for a VGA I/O write operation.

Reference is now made to FIG. 3 which depicts a flow diagram of the VGA I/O write operations for the SoftVGA handler 50. At step 54, an instruction attempting to perform a VGA I/O write is detected by trap circuitry in the bus controller 12 (FIG. 1). At step 56, if the bits in the control register are appropriately set, the SMI generator 21 (FIG. 1) generates an SMI to the CPU core 14 which, through an SMI handler, writes pertinent information to the SMI header (preferably located in the L1 cache 18) and vectors to predetermined SMI space holding the steps for assimilating the VGA I/O write operations. At step 58, the I/O address is decoded to identify which registers are being written. At step 60, the VGA register data structure representative of the VGA registers is updated in accordance with the trapped VGA instruction. At step 62, the cursor is updated if requested. At step 64, the palette is updated if requested. At step 66, the display mode is changed if requested. At step 68, the screen is redrawn if necessary. At step 69, the SoftVGA handler returns to the application program.

5.2 I/O Read Handler

Figure 4:
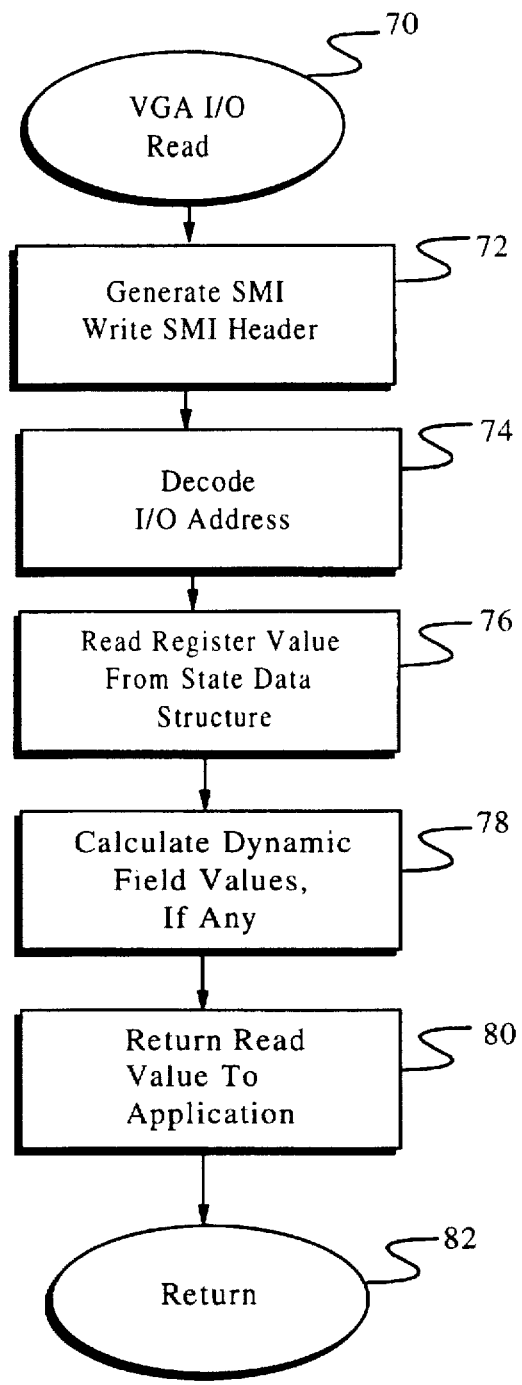
FIG. 4 depicts a flow diagram of a handler for a VGA I/O read operation.

Reference is now made to FIG. 4 which depicts a flow diagram of the VGA I/O read operations for the SoftVGA handler 50. At step 70, an instruction attempting to perform a VGA I/O read is detected by trap circuitry in the bus controller 12 (FIG. 1). At step 72, the SMI generator 21 (FIG. 1) generates an SMI to the CPU core 14 which writes pertinent information to the SMI header (preferably located in the L1 cache 18) and vectors to predetermined SMI space holding the steps for assimilating the VGA I/O read operations. At step 74, the I/O address is decoded to identify which registers are being read. At step 76, the register value is read from the VGA register data structure. At step 78, dynamic field values in the register are calculated, if any. At step 80, the read value is returned to the application program. At step 82, the SoftVGA handler 50 returns to the application program.

5.3 Memory Handler

Figure 5:
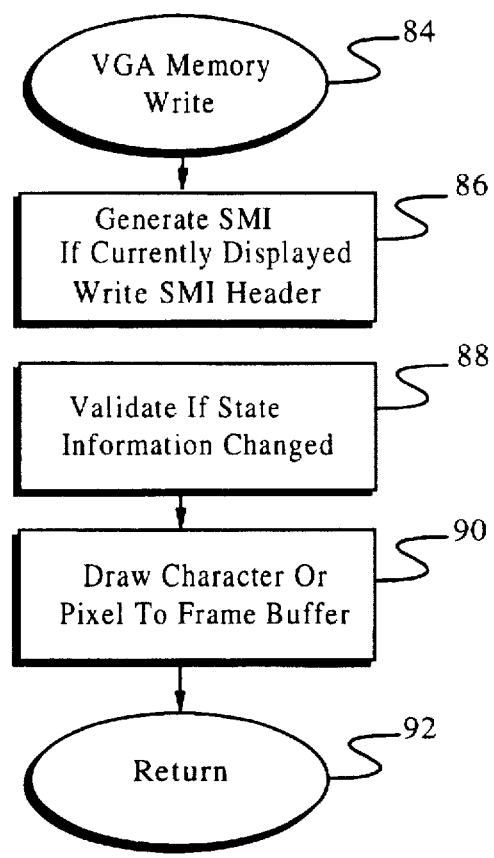
FIG. 5 depicts a flow diagram of a handler for a VGA memory write operation.

Reference is now made to FIG. 5 which depicts a flow diagram of VGA memory write operations for the SoftVGA handler 50. At step 84, an instruction attempting to perform a VGA memory write is detected by trap circuitry in the CPU core 14 (FIG. 1). At step 86, the SMI generator 21 (FIG. 1) generates an SMI if the memory access is displayable as set in the control and mask registers in the trap circuitry discussed hereinabove. At step 88, the VGA register data structure is validated if state information has changed. At step 90, the character or pixel is drawn to the direct-mapped frame buffer 35. At step 92, the SoftVGA handler 50 returns to the application program.

6. Conclusion

Although the Detailed Description of the invention has been directed to a certain exemplary embodiment, various modifications of this embodiment, as well as alternative embodiments, will be suggested to those skilled in the art. The invention encompasses any modifications or alternative embodiments that fall within the scope of the claims.

What is claimed is:

1. A processing system employing a virtual display subsystem comprising:
    (a) a pipelined core having a plurality of stages to execute at least one program having a plurality of instructions;
    (b) raster graphics circuitry coupled to the pipelined core that displays raster graphics;
    (c) a system management mode mechanism;
    (d) event trap circuitry, coupled to the plurality of stages of the pipelined core and responsive to a predetermined event occurring in at least one of the plurality of stages of the pipelined core arising from execution of selected instructions in the plurality of instructions, to invoke the system management mode mechanism wherein subsequent instructions to the selected instructions are not executed until after control is returned from the system management mode mechanism; and,
    (e) a video display handler, executable by the pipelined core under the system management mode mechanism, for controlling the raster graphics circuitry to assimilate a display protocol.

2. A processing system as recited in claim 1 wherein the raster graphics circuitry comprises:
    i) a display controller;
    ii) a graphics pipeline; and,
    iii) a RAMDAC.

3. A processing system as recited in claim 2 wherein the graphics pipeline comprises a VGA read path and a VGA write path.

4. A processing system as recited in claim 3 wherein the graphics pipeline further comprises a sequencer coupled to the VGA read and write paths, to break multi-byte reads and writes into single byte reads and writes.

5. A processing system as recited in claim 2 wherein the raster graphics circuitry further comprises a direct-mapped frame buffer.

6. A processing system as recited in claim 5 further comprising a VGA frame buffer wherein the video display handler converts data from the VGA frame buffer to the direct-mapped frame buffer.

7. A processing system as recited in claim 1 further comprising a scratchpad memory wherein the system management mode mechanism stores a header for use in the virtual display subsystem.

8. A processing system as recited in claim 1 wherein the event trap circuitry further includes programmable masking circuitry to prohibit the system management mode mechanism from being invoked when the predetermined event occurring in at least one of the plurality of stages of the pipelined core attempts to access selective memory or I/O regions.

9. A processing system as recited in claim 1 further comprising an external bus coupled to the pipelined core and wherein the event trap circuitry is also coupled external to the pipelined core and monitors the external bus.

10. A processing system employing a virtual display subsystem comprising:
    (a) pipelined core means for executing at least one program having a plurality of instructions;
    (b) raster graphics means, coupled to the pipelined core means, for outputting a graphics display;
    (c) event trap means, coupled to the pipelined core means and responsive to selected instructions being executed by the pipelined core means, for invoking the virtual display subsystem wherein subsequent instructions to the selected instructions are not executed until after control is returned from the system management mode mechanism;
    (d) display handler means for controlling the raster graphics means to assimilate a display protocol; and,
    (e) system management interrupt means, invokable by the event trap means, for diverting the pipelined core means from executing the at least one program to execute the display handler means.

11. A processing system as recited in claim 10 wherein the raster graphics means comprises:
    i) a display controller;
    ii) a graphics pipeline; and,
    iii) a RAMDAC.

12. A processing system as recited in claim 11 wherein the graphics pipeline comprises a VGA read path and a VGA write path.

13. A processing system as recited in claim 11 wherein the raster graphics means further comprises direct-mapped frame buffer means for buffering graphics data.

14. A processing system as recited in claim 13 further comprising VGA frame buffer means for buffering VGA data wherein the video display handler means converts data from the VGA frame buffer means to the direct-mapped frame buffer means.

15. A computer system having a virtual display subsystem comprising:
    (a) a motherboard;
    (b) a central processing unit having a pipelined core disposed on the motherboard that executes at least one program having a plurality of instructions;
    (c) memory disposed on the motherboard and coupled to the central processing unit;
    (d) raster graphics circuitry coupled to the central processing unit;
    (e) a system management mode mechanism;
    (f) event trap circuitry, coupled to the plurality of stages of the pipelined core of the central processing unit and responsive to a predetermined event occurring in at least one of the plurality of stages of the pipelined core arising from execution of selected instructions in the plurality of instructions being executed by the central processing unit, to invoke the system management mode mechanism wherein subsequent instructions to the selected instructions are not executed until after control is returned from the system management mode mechanism; and,
    (g) a video display handler, executable by the central processing unit under the system management mode mechanism, for controlling the raster graphics circuitry to assimilate a display protocol.

16. A computer system as recited in claim 15 wherein the event trap circuitry further detects predetermined I/O addresses on a bus external to the central processing unit.

17. A computer system as recited in claim 15 wherein the system management mode mechanism is reentrant.

18. A method of virtualizing a display subsystem in a processing system having a central processing unit with a pipelined core and raster graphics circuitry, comprising steps of:

(a) executing at least one program having a plurality of instructions;

(b) responsive to a predetermined event occurring in at least one of the plurality of stages of the pipelined core arising from execution of selected instructions in step (a), invoking a system management mode mechanism wherein subsequent instructions to the selected instructions are not executed until after control is returned from the system management mode mechanism;

(c) under the system management mode, transparently controlling the raster graphics circuitry to assimilate a display protocol; and, (d) returning to the at least one program.

19. A method as recited in claim 18 wherein step (c) further comprises a step of converting data from a VGA frame buffer to a direct-mapped frame buffer.

20. In a computer having a motherboard, a central processing unit with a pipelined core, and memory external to the central processor unit, a method of virtualizing a display subsystem comprising the steps of:

(a) executing in the central processor unit under an operating system, at least one application program having a plurality of instructions stored in an external memory;

(b) receiving an interrupt generated by a display subsystem access and detected by a predetermined event occurring in at least one of the plurality of stages of the pipelined core made under the at least one application program wherein subsequent instructions to the selected instructions are not executed until after control is returned from the system management mode mechanism;

(c) responsive to step (b), entering into an environment independent from the operating system;

(d) querying the display subsystem access in step (b) for an identity;

(e) performing an equivalent function of the display subsystem access identified in step (d) ordinarily performed by hardware external to the central processing unit; and, (f) returning from the environment independent from the operating system.

* * * * *